(12) United States Patent
Kellner et al.

(10) Patent No.: US 8,365,829 B2
(45) Date of Patent: Feb. 5, 2013

(54) TUBULAR SEAT AND TUBULAR ACTUATING SYSTEM

(75) Inventors: Justin Kellner, Pearland, TX (US); Travis Harris, Montgomery, TX (US); Jason Coe, Kingwood, TX (US); Dwayne Walkoviak, Magnolia, TX (US); James Scott Sanchez, Tomball, TX (US); David B. Ruddock, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 596 days.

(21) Appl. No.: 12/557,989

(22) Filed: Sep. 11, 2009

(65) Prior Publication Data

US 2011/0061856 A1 Mar. 17, 2011

(51) Int. Cl.
E21B 33/12 (2006.01)

(52) U.S. Cl. ............... 166/318; 166/317; 166/332.4; 166/193

(58) Field of Classification Search .......... 166/318, 166/317, 332.4, 192, 193
See application file for complete search history.

(56) References Cited

U.S. PATENT DOCUMENTS

| | | | |
|---|---|---|---|
| 2,769,454 A | 11/1956 | Bletcher et al. | |
| 2,973,006 A | 2/1961 | Nelson | |
| 3,007,527 A | 11/1961 | Nelson | |
| 3,211,232 A | 10/1965 | Grimmer | |
| 3,510,103 A | 5/1970 | Carsello | |
| 3,566,964 A | 3/1971 | Livingston | |
| 3,727,635 A | 4/1973 | Todd | |
| 4,669,538 A | 6/1987 | Szarka | |
| 4,826,135 A | 5/1989 | Mielke | |
| 5,297,580 A | 3/1994 | Thurman | |
| 6,098,713 A * | 8/2000 | Ross | 166/297 |
| 7,163,066 B2 * | 1/2007 | Lehr | 166/386 |
| 7,416,029 B2 * | 8/2008 | Telfer et al. | 166/386 |
| 7,637,323 B2 * | 12/2009 | Schasteen et al. | 166/318 |
| 2002/0162661 A1 | 11/2002 | Krauss et al. | |
| 2004/0011566 A1 * | 1/2004 | Lee | 175/317 |
| 2004/0163820 A1 * | 8/2004 | Bishop et al. | 166/373 |
| 2005/0126638 A1 | 6/2005 | Gilbert | |
| 2009/0044948 A1 | 2/2009 | Avant et al. | |
| 2009/0044949 A1 | 2/2009 | King et al. | |
| 2009/0044955 A1 | 2/2009 | King et al. | |
| 2011/0203800 A1 * | 8/2011 | Tinker et al. | 166/318 |
| 2012/0012771 A1 * | 1/2012 | Korkmaz et al. | 251/315.07 |

FOREIGN PATENT DOCUMENTS

JP 60030868 A * 2/1985

OTHER PUBLICATIONS

Notification of Transmittal of the International Search Report and The Written Opinion of the International Searching Authority; PCT/US2010/047798; International Searching Authority KIPO; Mailed Apr. 21, 2011.

* cited by examiner

Primary Examiner — Kenneth L Thompson
(74) Attorney, Agent, or Firm — Cantor Colburn LLP

(57) ABSTRACT

A pluggable seat includes, a first portion, positionable within a tubular, that is receptive to a runnable member seatable thereagainst, a second portion positioned downstream of the first portion, having a radial dimension smaller than a smallest radial dimension of the first portion, and a profile disposed at the second portion configured to increase resistance to extrusion of a runnable member past the pluggable seat in comparison to the same pluggable seat without the profile.

14 Claims, 4 Drawing Sheets

TUBULAR SEAT AND TUBULAR ACTUATING SYSTEM

BACKGROUND

In industries concerned with earth formation boreholes, such as hydrocarbon recovery and gas sequestration, for example, it is not uncommon for various operations to utilize a temporary or permanent plugging device. Sometimes it is desirable to plug the borehole at a specific location and then to later remove the plug. Systems employing droppable members, such as balls, for example, are typically used for just such a purpose. The ball is dropped to a ball seat positioned at the desired location within the borehole thereby creating the desired plug. Subsequently, reversing fluid flow and pumping the ball out in a direction opposite to that in which it was introduced can remove the plug. To facilitate this pumping operation balls made of relatively low density materials, such as, plastic, fiberglass, phenolic, composite or ceramic, for example, may be used as opposed to heavier balls made of solid metal, for example.

Balls made of these lower density materials, however, are susceptible to extrusion through a ball seat due to deformation of the ball under high loads. Since extrusion of the ball removes the desired plug, and can create an undesirable obstruction at other locations within the borehole, devices and systems that decrease the potential for such drawbacks would be well received in the art.

BRIEF DESCRIPTION

Disclosed herein is a pluggable seat. The pluggable seat includes, a first portion, positionable within a tubular, that is receptive to a runnable member seatable thereagainst, a second portion positioned downstream of the first portion, having a radial dimension smaller than a smallest radial dimension of the first portion, and a profile disposed at the second portion configured to increase resistance to extrusion of a runnable member past the pluggable seat in comparison to the same pluggable seat without the profile.

Further disclosed herein is a pluggable seat retainer enhancement mechanism that includes a profile on a downstream portion of a pluggable seat configured to increase extrusion forces of a runnable member seatable thereagainst.

Further disclosed herein is a tubular actuating system. The system includes, a tubular, a ball, runnable within the tubular, having a ball diameter, an actuator disposed at the tubular, a seat disposed at the actuator having a minimum diameter smaller than the ball diameter and receptive to the ball, and a profile disposed at the seat having dimensions no smaller than the minimum diameter configured to increase pressure needed to extrude the ball past the seat.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
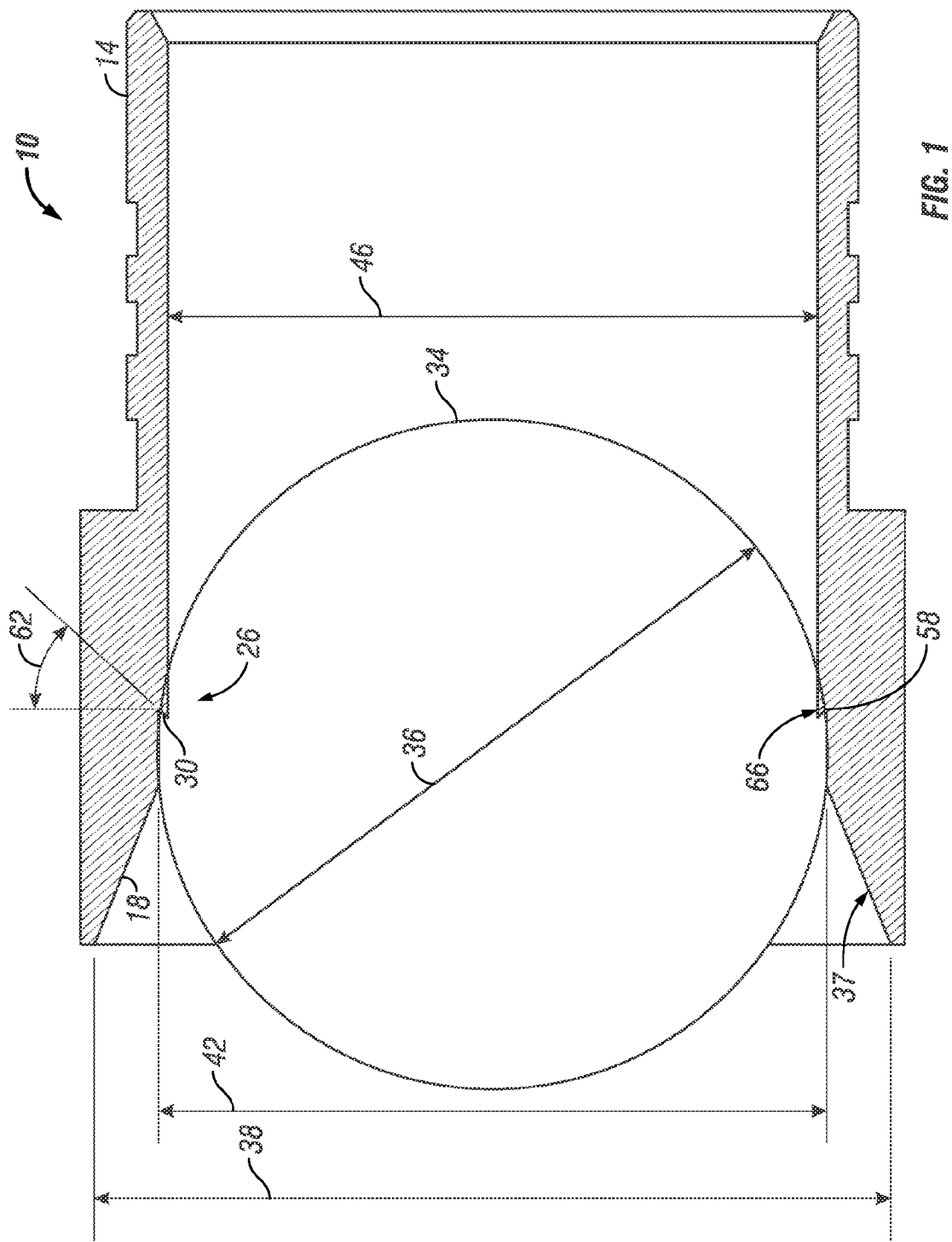
FIG. 1 depicts a cross sectional view of a tubular runnable member seat disclosed herein.

Referring to FIG. 1, an embodiment of a tubular runnable member seat disclosed herein is illustrated generally at 10. The seat 10 includes, a body 14 having a first portion 18, and a second portion 26 with a profile 30 disposed thereat. The seat 10 is receptive to a runnable member 34 illustrated in this embodiment as a ball having a ball diameter 36, such that the seat 10 is pluggable by the runnable member 34. The second portion 26 includes a diameter 46 that is smaller than both diameters 38 and 42, which define a frustoconical surface 37, and is located downstream of both diameters 38 and 42. A longitudinal dimension of constant diameter 42 may connect the first portion 18 to the second portion 26. The ball 34 disclosed herein is constructed of a relatively low weight material, such as, plastic, fiberglass, phenolic, composite or ceramic, for example, as opposed to solid metal to facilitate pumping of the ball 34 in a direction opposite to gravity, for example. As such, the ball 34 is deformable and can be extruded past diameters 38 and 42 and into profile 30.

In many applications it is undesirable for the ball 34 to extrude past the seat 10. One method of preventing such extrusion is to make the smallest dimension of the seat 10, which in this case is the diameter 46, so small that the ball 34 is not able to extrude through it. The smaller the diameter 46 is, however, the greater the restriction to flow, such as production flow of hydrocarbon fluids in the case of a downhole hydrocarbon recovery application, and the less production per unit of time. Additionally, the smaller the diameter 46 is the fewer the total number of seats, of smaller diameter, that can be positioned along a tubular, such as a drillstring, for example.

The profile 30 of the second portion 26 prevents extrusion of the ball 34 at higher pressures than would be retained by a seat having the same diameter 46 without the profile 30. The profile 30, in this embodiment is illustrated as a tooth defined by a frustoconical surface 58 that connects the diameter 46 to the diameter 42 via rake angle 62. An edge 66 of the tooth 30 is configured to bite into the ball 34 as the ball 34 is extruded through the second diameter 42. This biting action increases a pressure needed to extrude the ball 34 past the seat 10 to a greater pressure than would be needed if the seat 10, instead of having the profile 30, continued the frustoconical surface 37 directly to the diameter 46. The rake angle 62, as shown, is approximately 30-60 degrees, however, the rake angle 62 could be any angle practical between zero and 90 degrees.

Figure 2:
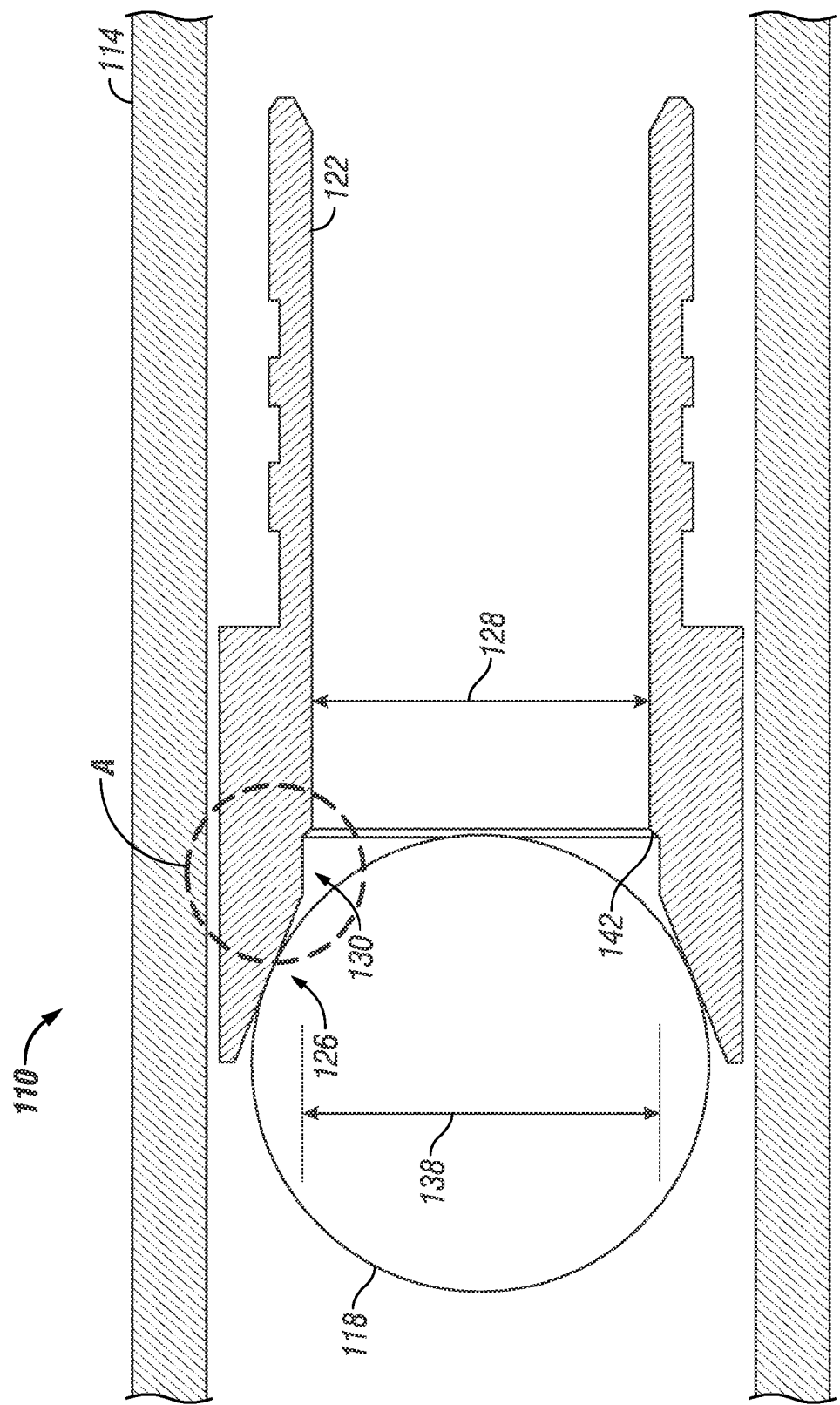
FIG. 2 depicts a cross sectional view of a tubular actuating system disclosed herein.

Referring to FIG. 2, an embodiment of a tubular actuating system disclosed herein is illustrated generally at 110. The actuating system 110 includes, a tubular 114, a ball 118, runnable within the tubular 114, and an actuator 122 disposed at the tubular 114 having a seat 126 receptive to the ball 118. The seat 126 has a minimum diameter 128 and a profile 130. The profile 130 has no dimension smaller than the minimum diameter 128. The profile 130 is configured to increase a pressure needed to extrude the ball 118 therepast in comparison to a seat without the profile 130. Different embodiments of the profile 130 will be described in detail below.

Figure 3:
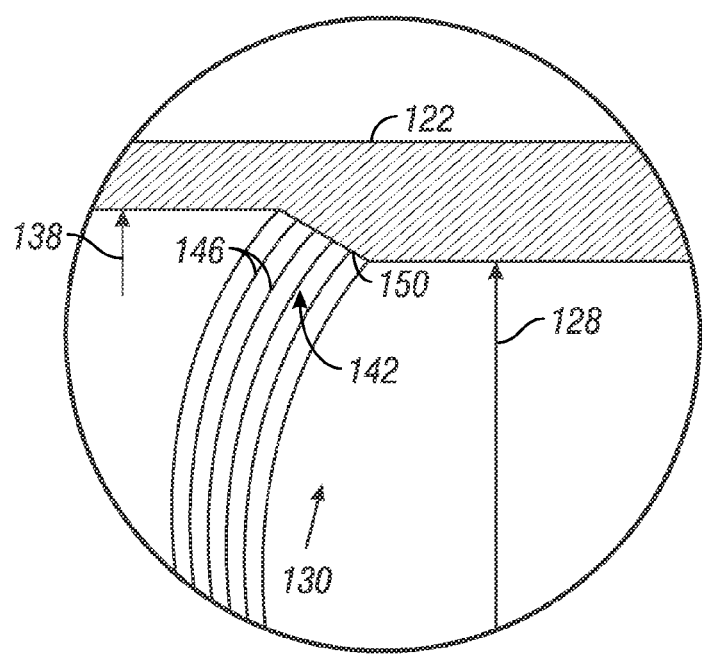
FIG. 3 depicts a magnified partial perspective cross sectional view in the area of circle "A" of the embodiment of the tubular actuating system of FIG. 2.

Referring to FIG. 3, a magnified perspective view of the area of circle "A" is depicted showing the profile 130 that includes a chamfer 142 that connects the minimum diameter 128 to a larger diameter 138 positioned upstream of the chamfer 142. The chamfer 142 is illustrated herein as a frustoconical surface with serrations 146 thereon. The serrations 146 illustrated are a plurality of teeth 150 that protrude from the frustoconical surface 142, however, serrations 146 that are a plurality of grooves formed in the frustoconical surface 142 are also contemplated.

Figure 4:
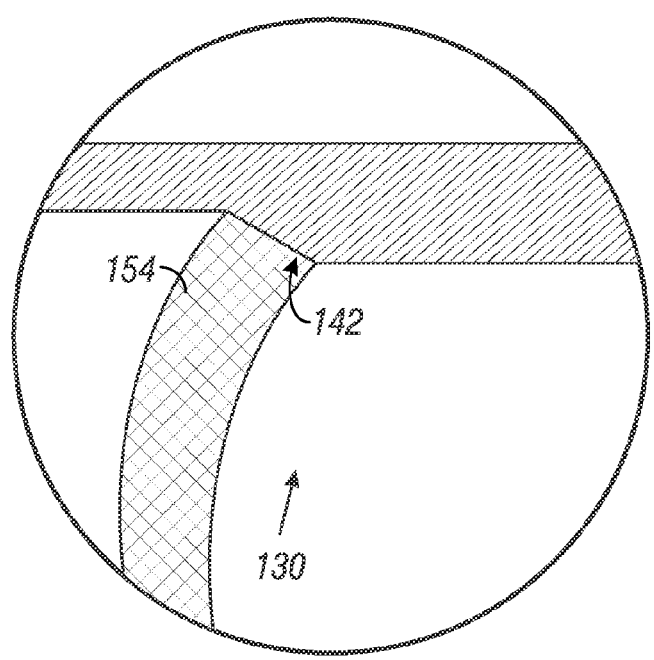
FIG. 4, depicts a magnified partial perspective cross sectional view of an alternate embodiment in the area of circle "A" of the tubular actuating system of FIG. 2.

Referring to FIG. 4, a magnified perspective view of the area of circle "A" is depicted showing another embodiment of the profile 130 illustrated as a knurl 154 formed into the frustoconical surface 142. Although the profiles 130 illustrated herein include a plurality of symmetrical details formed into the frustoconical surface 142, it should be noted that other embodiments could include any detail that increases frictional engagement between the ball 118 and the profile 130. Additionally, the profile 130 need not include the frustoconical surface 142, but any detail the increases resistance to extrudable passage of the ball 118 by the seat 126.

Figure 5:
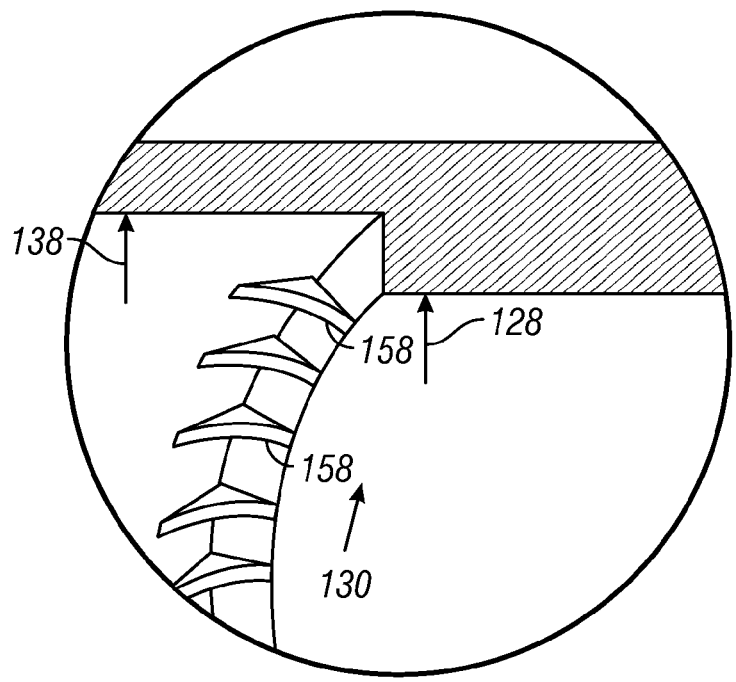
FIG. 5, depicts a magnified partial perspective cross sectional view of another alternate embodiment in the area of circle "A" of the tubular actuating system of FIG. 2.

Referring to FIG. 5, a magnified perspective view of the area of circle "A" is depicted showing another embodiment of the profile 130 having a plurality of buttresses 158 positioned between the minimum diameter 128 and the larger diameter 138 is illustrated.

Figure 6:
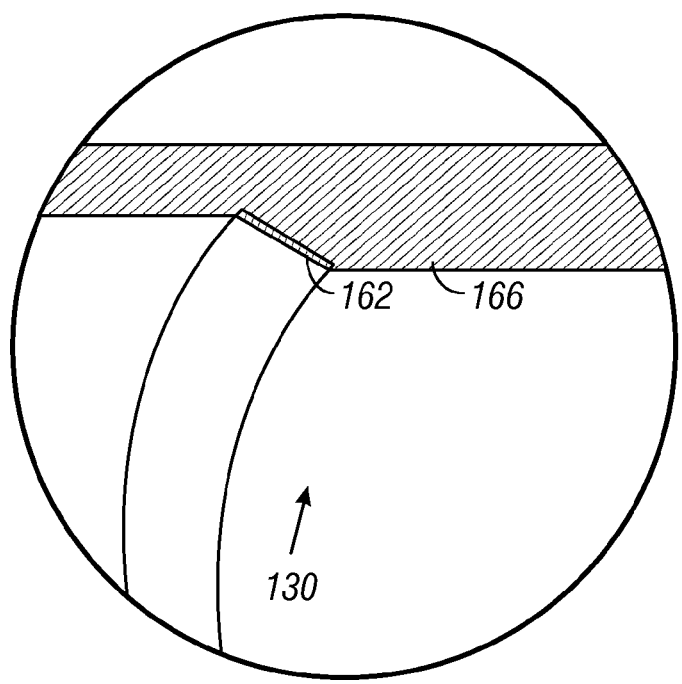
FIG. 6 depicts a magnified partial perspective cross sectional view of yet another alternate embodiment in the area of circle "A" of the tubular actuating system of FIG. 2.

Referring to FIG. 6, a magnified perspective view of the area of circle "A" is depicted showing another embodiment of the profile 130 having a profile material 162 other than a material 166 from which the balance of the seat 126 is made is illustrated. The profile material 162 can be attached to the material 166 by any means available, including, welding, soldering, brazing, plating, coating and painting for example. The profile material 162 can be any material having a greater coefficient of friction with the ball 118 than the material 166.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A pluggable seat, comprising:
   a first portion, positionable within a tubular, being receptive to a runnable member seatable thereagainst at a frustoconical surface thereof;
   a second portion positioned downstream of the first portion, downstream being defined as a direction that the runnable member is moved into seating engagement with the pluggable seat, having a radial dimension smaller than a smallest radial dimension of the first portion; and
   a profile disposed at the second portion configured to increase resistance to extrusion of a runnable member past the pluggable seat in comparison to the same pluggable seat without the profile.

2. The pluggable seat of claim 1, wherein the profile includes at least one tooth positioned and oriented such that a radial surface of the pluggable seat that connects the first portion with the second portion extends downstream of a surface of the at least one tooth.

3. The pluggable seat of claim 2, wherein the surface of the at least one tooth forms an angle between zero and ninety degrees with the radial surface of the pluggable seat.

4. The pluggable seat of claim 1, wherein the profile includes a chamfer.

5. The pluggable seat of claim 1, wherein the runnable member is a ball.

6. The pluggable seat of claim 1, wherein the radial dimension is a radius.

7. The pluggable seat of claim 1, wherein the profile includes a knurl.

8. The pluggable seat of claim 1, wherein the profile includes serrations.

9. The pluggable seat of claim 1, wherein the profile includes a plurality of buttresses.

10. The pluggable seat of claim 1, wherein the profile includes a material attached thereto configured to increase friction between the runnable member and the profile.

11. A tubular actuating system, comprising:
    a tubular;
    a ball being runnable within the tubular;
    an actuator disposed at the tubular;
    a seat disposed at the actuator having a first diameter smaller than the ball diameter being seatably receptive to the ball at a frustoconical surface of a first portion thereof; and
    a profile disposed at a second portion of the seat having a second diameter that is smaller than the first diameter and positioned downstream of the first portion, downstream being defined as a direction that the ball is moved into seating engagement with the seat, the profile being configured to require greater pressure to extrude the ball therepast than pressure required to extrude the ball past the first portion.

12. The tubular actuating system of claim 11, wherein the ball is deformable.

13. The tubular actuating system of claim 11, wherein the profile includes a material attached to the seat that has a greater coefficient of friction with the ball than a material that the seat is made of.

14. The tubular actuating system of claim 11, wherein the profile includes one of, knurls, serrations and buttresses.

* * * * *